May 19, 1959   G. W. BAIN   2,887,601
POLARIZED ELECTROLUMINESCENT PHOSPHORS AND DIELECTRICS
Filed Aug. 1, 1956

INVENTOR.
GEORGE W. BAIN
BY
*George A. Gust*
ATTORNEY

2,887,601

POLARIZED ELECTROLUMINESCENT PHOSPHORS AND DIELECTRICS

George W. Bain, Fort Wayne, Ind., assignor to International Telephone and Telegraph Corporation Application August 1, 1956, Serial No. 601,504

2 Claims. (Cl. 313—108)

This invention relates to panels or other coherent insulating or semi-insulating bodies containing electroluminescent materials.

Heretofore, phosphor particles were disbursed in a mass of high dielectric material which is sprayed, painted, silk-screened or otherwise applied in the liquid state to the surface to be made luminescent. An alternating, pulsed, or direct current electric field can be applied to the mass to excite and glow the phosphor particles. The intensity of the glow, it has been found, depends upon the electrical gradient across the individual phosphor particles. This gradient in turn depends upon the relative dielectric constants of the phosphor particles and of the supporting media for the particles. For a random mixture of the two materials, a high dielectric constant of the supporting media is required in order to produce a high gradient across the phosphor particles. In general, the efficiency of such a system is quite low, as an appreciable portion of the field is always lost across the dielectric media which is in series with the phosphor particles and the two end electrodes. There is also appreciable current flowing around the phosphor particles through the surrounding high dielectric media in parallel paths which do not contribute to the luminescence. As the dielectric constant of the surrounding media is increased, this effect is more and more important.

The object of this invention is to provide a panel or body which luminesces more efficiently in a given level of the electric excitation.

The object of this invention is attained by mixing the desired quantity of finely powdered luminescent material in a liquid batch of moldable insulating material and applying an electric field across the mixture while the mixture is in the liquid state when the particles are mobile and during the setting of the material whereby the particles are polarized or aligned in chains in response to said electric field and held in the polarized chains while the insulating material sets.

The above mentioned and other features and objects of this invention and the manner of attaining them will become more apparent and the invention itself will be best understood by reference to the following description of an embodiment of the invention taken in conjunction with the accompanying drawings, wherein.

According to one embodiment of this invention, a small quantity of finely-ground phosphor material is mixed in a moldable liquid plastic. While the liquid mass is yet fluid, an alternating or direct current field is applied to the mass. The field is maintained until the mass dries and hardens sufficiently to render the disbursed particles immobile therein. It has been found that the particles are in random suspension in the absence of such a field and that the particles are effectively spaced and insulated from each other.

Figure 3:
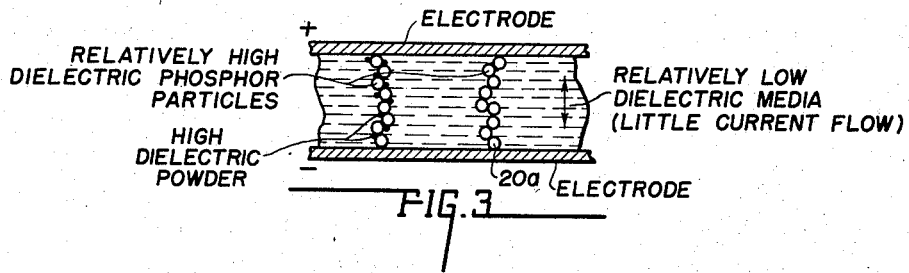
Fig. 3 is an enlarged sectional view of a panel.

However, when the electric field is applied to the liquid, the suspended phosphor particles appear to line up in long connecting chains or filaments parallel to the electric lines of force, as suggested in Fig. 3. The phosphor particles remain in suspension in the insulating media but the individual particles are pulled tightly together so that there is practically no separation between the elements of the chain. For this reason, the field is concentrated across the phosphor particles themselves. This is the ideal condition for efficient use of the energy of the electric field.

When the supporting media for the polarized phosphor particles have a high breakdown strength and low dielectric constant, a strong field can be maintained with very little loss in the media parallel to the chains. This lowers the effective capacity and decreases the unwanted current through the supporting media. Most of the current flows through the phosphor chains since their dielectric constant is much higher than that of the surrounding media. It has been found that the end result of this invention is an electroluminescent phosphor with greatly increased brightness, lower capacity, and greater efficiency.

Experiments have shown a gain in brightness of twenty times, with an increase in capacitance of only two or three for a given applied field compared to the same plate made by the same materials and by the same steps in manufacture, except that the phosphor particles were not polarized.

Figure 1:
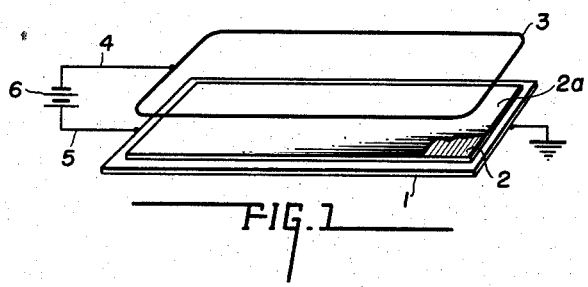
Fig. 1 is a perspective view of one luminescent panel made according to this invention.

The polarization is accomplished by applying a strong electric field of direct or alternating current across the mixture while the particles can still move in the mixture under the influence of the field. This may be done by spraying with the field applied as shown in Fig. 1. Upon the metal plate 1 is laid the insulating panel 2, the surface of which is to be coated with an electroluminescent layer 2a. Electrostatic lines of force are established normal to the plate 1 and panel 2, as, for example, by positioning a metal ring 3 above the plate. Terminals 4 and 5 to the plate and ring are connected to a voltage source 6 of direct current, or alternating current of commercial frequencies. While the field is applied, a layer of the desired mixture of liquid plastic and phosphor powder is sprayed upon the panel 2.

Figure 2:
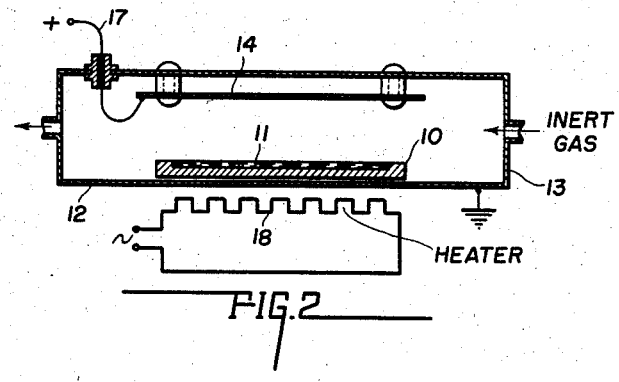
Fig. 2 is a section of a drying oven.

Alternatively, the entire panel may be molded of the plastic-phosphor mixture. In Fig. 2, for example, the mold 10 is filled level-full with the liquid mixture 11. The mold 10 may be of metal or contain a device with an electrode connected to the metal floor 12 of the drying oven 13. Parallel to and above the mold is insulatingly supported the metal plate 14 connected to voltage source 17 for applying a strong electrostatic field to the liquid 11. The liquid 11 may be dried and set at room temperature or at the elevated temperature of a drying oven depending upon the composition of the materials used. Desirably, the oven should be flushed with inert gas while drying most plastics. The particular oven of Fig. 2 has the resistance heating element 18 for accelerating drying.

A sprayed panel may be polarized by being put into a polarizing drying oven before the plastic has set or after it has been set but re-wet again. The panel would replace the mold 10 in the oven of Fig. 2.

Many electroluminescent materials may be used, one of these being zinc sulfide, activated with impurities such as manganese, silver, gold, copper and co-activated with such elements as chlorine, bromine or iodine. These phosphors glow with whitish or blush-green cast.

The liquid moldable materials may be of many varieties including the cold-mold and hot-mold plastics. Many of the thermosetting and thermoplastic resins, the cellulosics, and the natural resins, shellac and rosin, generally, have the requtisite mechanical properties and the desired insulating values including adequate dielectric constant for this purpose. One mixture which proved to have high illuminating efficiency comprised about 50% of phosphor zinc sulfide, and about 50% of ethyl-cellulose plastic material thinned with toluene to good spray-gun consistency.

In Fig. 3, the structural arrangement of the phosphor particles in the dielectric media is shown greatly enlarged and somewhat idealized. While the dielectric media is in the liquid state, an electrostatic field is applied, and the phosphor particles 20a are attracted into chains approximately parallel to the electric lines of force. It follows that the relatively low dielectric media passes less current than the phosphor particle chains of relatively high dielectric constant. To further improve the conductivity of the chains, it has been found helpful to add to the phosphor particles a small amount of powder having a relatively high dielectric constant. Iron powder, for example, will move into the chain and improve the conductivity of the chain, thus further increasing the ratio of the conductivity of the phosphor and plastic media paths.

Figure 4:
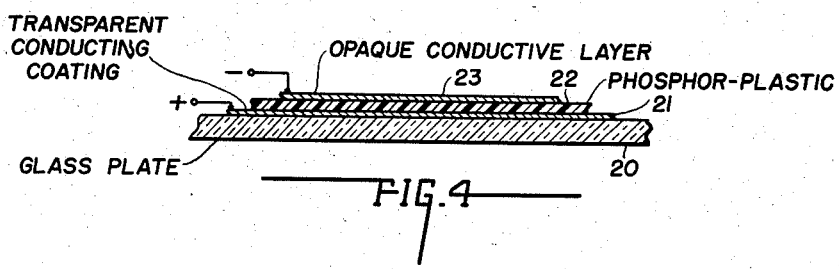
Fig. 4 is a sectional view of another panel of this invention.

In Fig. 4 is shown, in enlarged detail, one panel constructed according to this invention. Upon the glass plate 20 is deposited a transparent conducting coating 21 to which is applied the layer 22 of polarized phosphor-plastic material. This assembly should then be covered with the conductive layer 23 which may, if desired, be made opaque. A potential applied to electrodes 21 and 23 will cause the phosphor layer 22 to glow with brilliance. Any design formed in the phosphor-plastic layer 22 is clearly visible through the glass plate.

While the principles of the invention have been described in connection with specific apparatus, it is to be clearly understood that this description is made only by way of example and not as a limitation to the scope of the invention.

What is claimed is:

1. An electroluminescent body comprising: a coherent mass moldable plastic-type material having relatively high breakdown strength and low dielectric constant, said mass containing a sufficient quantity of disbursed particles of phosphor material to emit visible light when excited in an electric field, said mass further containing a powder of high dielectric constant admixed with said phosphor material, said disbursed particles of phosphor material and said powder being characterized by polarization and microscopic chains through said mass.

2. An electroluminescent body comprising: a coherent mass moldable plastic-type material having relative high breakdown strength and low dielectric constant, said mass containing a sufficient quantity of disbursed particles of phosphor material to emit visible light when excited in an electric field, said mass further containing iron powder admixed with said phosphor material, said disbursed particles of phosphor material and said powder being characterized by polarization and microscopic chains through said mass.

References Cited in the file of this patent

UNITED STATES PATENTS 2,728,870     Gungle et al. _____ Dec. 27, 1955

OTHER REFERENCES

"Transient Voltage Indicator and Information Display Panel," by Arthur Bramley and Jenny E. Rosenthal, Review of Scientific Instruments, vol. 24, No. 6, June 1953.